United States Patent Office 2,801,955
Patented Aug. 6, 1957

2,801,955
PROCESS FOR EXTRACTION OF HEMICELLULOSE

Morton W. Rutenberg and William Herbst, North Plainfield, N. J., assignors to National Starch Products Inc., New York, N. Y., a corporation of Delaware No Drawing. Application November 17, 1955, Serial No. 547,569

7 Claims. (Cl. 195—9)

This invention relates to a method for the extraction of hemicellulose. More particularly, it is concerned with an improved method for obtaining hemicellulose from corn bran. A prime object of the invention is to obtain hemicellulose characterized by a color far lighter than any heretofore obtainable.

By means of our extraction process we are able to obtain hemicellulose extracts ranging from pale amber to water-white in color, as compared to the extremely dark brown, almost black, color generally associated with hemicellulose dispersions. The importance of this light color, in vastly increasing the fields of industrial usefulness of hemicellulose, will be explained subsequently.

Hemicellulose is a carbohydrate material occurring in the cell walls of plants in conjunction with cellulose and lignin. It is ordinarily obtained from plant materials by extraction with aqueous solutions of sodium hydroxide. Hemicellulose is present in most plant materials, although the proportion of hemicellulose varies in different plant sources, and in different parts of the same plant. Some of these plant sources include wood, oat hulls, straw, corn cobs and corn bran.

As stated, this invention is particularly concerned with an improved process for extracting hemicellulose from corn bran. Corn bran is a by-product of the corn wet milling process, and comprises the fibrous, cellulosic material remaining after the corn kernel is ground and the starch and oil content substantially removed. It consists chiefly of the hull of the corn kernel. It is often known in the trade as "corn fiber."

Hemicellulose has heretofore been removed from corn bran and other plant sources by treating the plant material with an aqueous solution of sodium hydroxide. This acts to solubilize the hemicellulose portion, and the extract containing the dispersed hemicellulose is separated, as by filtration, from the residual solids. The hemicellulose solution may be used as such, after concentration by evaporation or distillation, or the hemicellulose solids may be precipitated by alcohol, acetone, or other organic solvent. Alternatively, the solution of hemicellulose may be dried by passing over heated drums, spray drying, or other suitable means. In any case, when the usual monovalent alkali metal hydroxides (such as sodium or potassium hydroxides) or ammonium hydroxide are used for the hemicellulose extraction, the resulting hemicellulose solution is an extremely dark, orange-brown liquid, and the solid hemicellulose obtained therefrom again gives dark aqueous dispersions when redispersed.

Hemicellulose is characterized by properties which make it a valuable additive in many industrial compositions. Thus, in copending application Serial No. 342,-977, filed March 17, 1953, now Patent No. 2,772,981, the use of hemicellulose in paper coating compositions is set forth and it is shown that hemicellulose aids in preventing viscosity breakdown and loss of thixotropic properties of coating compositions during machine operations. In copending application, Serial No. 487,690, filed February 11, 1955, there is described a method for improving the whiteness retention of detergents by the addition of hemicellulose, and in copending application Serial No. 523,934, filed July 22, 1955, there is set forth the advantage of using cyanoalkylated hemicellulose, among other materials, for the same purpose.

The commercial acceptance of hemicellulose for the above and other uses has been hindered, however, by the dark color of its solutions. Attempts to lighten or remove the coloration by treatment with activated carbon or other known decolorizing methods have not been sufficiently successful to be commercially significant.

We have now discovered a method for producing clear, light to water-white dispersions of hemicellulose from corn bran, thus removing a major bar to its commercial usefulness.

Our process comprises the extraction of hemicellulose from corn bran with the aid of calcium hydroxide.

In the preferred embodiment of our invention, the extraction with calcium hydroxide is followed by an additional step, namely the treatment of the hemicellulose extract with activated carbon or equivalent decolorizing medium. The first of the steps, namely the extraction with calcium hydroxide, may comprise the use of calcium hydroxide as the sole alkaline material in the extraction of the hemicellulose from corn bran, or it may comprise the treatment of the corn bran with calcium hydroxide as an alkaline material in conjunction with a conventional alkali such as sodium hydroxide. In any case, it is seen that the corn bran must be acted upon by calcium hydroxide.

The extraction of hemicellulose from corn bran with calcium hydroxide in itself leads to hemicellulose extracts far lighter in color than those heretofore obtained by the use of sodium hydroxide as the extractant. However, we have further found that if a hemicellulose extract which has been obtained by the use of calcium hydroxide as the alkaline material is subsequently treated with activated carbon, synthetic decolorizing resin, or equivalent decolorizing medium, the improvement in color (or, one might say, the reduction in color) is notably more marked. By such carbon treatment of a calcium hydroxide extracted hemicellulose, it is possible to obtain extracts of extremely light color, to the point of being water-white and water-clear. This notable effectiveness of carbon decolorization of a calcium hydroxide extracted hemicellulose was entirely unpredicted, since the dark color of a conventional sodium hydroxide extracted hemicellulose is not easily ameliorated by treatment with activated carbon or other decolorizing media under practicable conditions whereby lime extracts are easily decolorized.

Therefore, the preferred embodiment of our invention is the combination of two steps, namely, extraction of hemicellulose from corn bran with the aid of calcium hydroxide, followed by treatment of the extract with activated carbon or equivalent. In the second order of preference, we would place the extraction of hemicellulose from corn bran, using calcium hydroxide as the extractant, without further decolorization of the extract. In the third order of preference, we would place the extraction of hemicellulose with a combination of calcium hydroxide and a conventional monovalent alkali of the type of sodium hydroxide, with or without further decolorization by activated carbon.

Our process will now be described in detail, with examples of its operation:

The corn bran is preferably finely ground, although a coarse-ground bran may be employed. A greater yield of hemicellulose is ordinarily obtained from a finely ground bran. The bran is mixed in water, containing calcium hydroxide, which may be added as such or in the form of calcium oxide, which forms the hydroxide upon contact with the water. Sodium hydroxide or other alkali may also be dissolved in the water. The total amount of alkaline material present should be enough to provide a pH within the range 10–12.5 at the beginning of the extraction, and remaining above 6.5 at the end of the extraction. Acids are ordinarily released during the extraction, and sufficient alkali should be used to neutralize these acids, to avoid degradation of the extracted hemicelloulse.

A time-temperature-alkalinity relationship prevails in the extraction of hemicellulose. Thus, the extraction may take place at room temperatures, or at temperatures ranging up to approximately 190° C. The time needed for extraction will vary with the temperature and degree of alkalinity. At room temperature, considerably longer periods are required. At temperatures within the range 90–160° C. (which we prefer), about one hour is ordinarily sufficient for extraction of the hemicellulose from the corn bran. At higher temperatures, a shorter period is ordinarily sufficient.

After treatment of the corn bran in the alkaline solution, the extract is separated from the bran solids by any suitable means, such for example as settling and decantation, screening, filtration, centrifuging, or the like.

If the above-described extraction of the hemicellulose has been accomplished by the use of calcium hydroxide as the sole alkaline material, or by a mixture of calcium and sodium hydroxides, it will be found that the resultant extract is considerably lighter in color than a corresponding extract obtained by extraction in the absence of calcium hydroxide. This relatively light colored extract may be used as such, or (according to the preferred embodiment of our invention) it may then be treated with activated carbon or equivalent decolorizing means, such for example as a synthetic decolorizing resin. This may be done, for example, by mixing the extract with the carbon, followed by filtration to remove the carbon, or by passing the extract through a column of the activated carbon. A remarkable improvement in color is obtained by the carbon treatment.

If the extraction of the hemicellulose has been effected by the use of a mixture of calcium and sodium hydroxides (rather than by straight calcium hydroxide), the reduction in color of the resultant extract will be found to be more marked as the ratio of calcium to sodium hydroxide is increased. In order to obtain a significant improvement in color of the extract, when using a mixture of calcium and sodium hydroxides as the extractants, the ratio of calcium hydroxide to the sodium hydroxide should be at least about 0.3:1.

It is seen that the presence of significant proportions of calcium hydroxide during the extraction of the hemicellulose is an essential element of our process. With regard to proportions, when calcium hydroxide is used as the sole alkaline medium for the extraction of hemicellulose from the bran, enough should be used, as stated, to obtain a pH of about 10 to 12.5 in the bran-water-calcium hydroxide slurry. When a mixture of calcium and sodium hydroxide is used in the original extraction, the same pH is required, and the ratio of calcium to sodium hydroxide should be at least about 0.3:1.

The following examples will further illustrate the embodiment of our invention:

EXAMPLE I

This example illustrates the prior known method of extracting hemicellulose with sodium hydroxide solution. It also illustrates the treatment of such an extract with activated carbon. As will be seen from the table of colorimetric measurements which appears at the end of the examples, the sodium hydroxide extract is far darker than that obtained by the use of calcium hydroxide as the extractant, and it is further seen that the treatment of the sodium hydroxide extract with activated carbon does not under similar conditions materially improve its color.

300 grams of coarse corn bran (10.5% moisture content), comprising fiber from the wet milling of corn, were dispersed in a solution of 21.6 grams sodium hydroxide in 3 liters of water. This corresponds to approximately 1.8 milliequivalents of alkali per part of bran. The pH of the mixture was 12.5. The mixture was heated in an autoclave with continuous stirring, the pressure rising to 70 p. s. i. It required 35 minutes for the pressure to reach this value, which corresponded to a temperature of approximately 158° C. The extraction mixture was maintained at this point for 1¼ hours, and then cooled. The final pH was 9.5. Three liters of water were added, to facilitate removal from the autoclave and the subsequent centrifugal separation of the extract.

The mixture was centrifuged in a basket-type centrifuge, thus separating the liquid extract from the solid residue. The extract was designated "Extract A."

Extract A was a dark brown liquid. A sample was subjected to colorimetric measurement, as indicated in the table at the end of the examples. The extract was permitted to stand overnight to settle the retrograded starch content (a certain amount of residual starch is present in corn bran, and finds its way into the extract during centrifuging). The extract was decanted from this settled sludge. An aliquot of the extract (900 ml.) was mixed with 3.2 grams activated carbon (of the type sold by the Pittsburgh Coke and Chemical Company under the trade name "RB Pulverized"). The mixture was agitated at 80° C. for 1 hour. The carbon was then removed by filtration, using a filter aid (Johns-Manville Corporation's "Super-Cel"). The resulting extract was designated "Extract $A_1$." A sample was subjected to colorimetric measurement, and as will be noted from the table at the end of the examples, there was no significant improvement in color as compared to the extract which had not been subjected to carbon treatment (Extract A).

In order to determine the actual yield of hemicellulose, a 900 ml. aliquot was removed from the original 3900 ml. of Extract A. The aliquot was acidified with acetic acid to pH 4.5 and poured into two volumes of ethyl alcohol with vigorous stirring. The resulting precipitate of hemicellulose was filtered off, washed with alcohol and ether and dried in air. 23.3 grams of hemicellulose was thus obtained, which was equivalent to a calculated total yield of 35.7% (dry basis), if all of the extract had been treated in this manner.

EXAMPLE II

This example illustrates the extraction, at room temperature, of hemicellulose from corn bran, employing calcium hydroxide as the extractant.

75 gms. of corn bran, obtained in the wet milling of corn, were finely ground and dispersed in a slurry containing 16.1 gms. calcium hydroxide in 500 ml. water. The mixture was gently agitated for about 40 hours at room temperature in a closed vessel. The calcium hydroxide used was approximately 6.1 milliequivalents per gram of dry bran. The pH of the mixture was 12.1, both at the beginning and end of the mixing period. The mixture was then diluted with water, and the extract separated from the solid residue by centrifuging in cups. This extract was designated "Extract B."

In order to recover any extract that might not have been removed from the bran during the first centrifuging operation, the solid residue from the above-described centrifuging was redispersed in water (pH was 12) and recentrifuged. This second extract was designated "Extract C."

Approximately 380 ml. of Extract B and 400 ml. of Extract C were obtained. Fifty ml. aliquots of each of the extracts were removed for colorimetric assay. It will be noted, from the table at the end of these examples, that even with lime treatment at room temperature, and without subsequent activated carbon decolorization, the colorimeter values for light transmittance were substantially higher than in the case of the sodium hydroxide extracted material of Example I, indicating lighter colors for the lime-extracted hemicellulose extract.

These lighter colors were also obvious from visual examination.

In order to determine the yields of hemicellulose obtaiend, the remaining portions of Extracts B and C were acidified to pH 4.5 with hydrochloric acid and each poured into two volumes of vigorously stirred ethyl alcohol. The hemicellulose thus precipitated was washed in alcohol and acetone by decantation, filtered and air-dried. Extract B yielded 5.2 grams hemicellulose (19.8% moisture) and Extract C, 1.7 grams (15.7% moisture). The total dry yield of hemicellulose, calculated after adjusting for the aliquots removed was 9.1%.

EXAMPLE III

This example illustrates the extraction of hemicellulose from corn bran with heat, employing calcium hydroxide as the extractant.

The same materials, proportions and procedures were employed as in Example II, except that the extraction was carried out at 70° C., for 16 hours. The first extract (designated "Extract D") amounted to 585 ml., and the second extract (designated "Extract E") which resulted from the redispersal and recentrifuging of the solid residue of the first extraction, amounted to 500 ml. 525 ml. of Extract D and 400 ml. of Extract E were precipiated in alcohol, as in Example II, yielding 15.1 grams and 5.7 grams of hemicellulose, respectively. The total calculated yield, taking into account the aliquots that had been removed for colorimetric analysis, was 27.6% hemicellulose, dry basis. As will be noted from the table, colorimetric readings of the extracts indicated color values somewhat better than the room temperature extracted material of Example II, and far lighter than the conventional sodium hydroxide extract of Example I.

EXAMPLE IV

This example illustrates the extraction, with heat, of hemicellulose from corn bran, employing varying combinations of calcium hydroxide and sodium hydroxide, as well as each of these alkaline materials alone.

100 gram samples of ground corn bran were slurried in vessels containing one liter of water with either sodium hydroxide, calcium hydroxide, or mixtures of these two reagents. Contact with the carbon dioxide of the air was avoided during the mixing. The total amount of alkali in each case was approximately 1.8 milliequivalents per gram of bran, and the initial pH was 12.5. The extraction was carried out at 95–100° C. for 1 hour, with mechanical stirring. Four samples were involved, the first using straight sodium hydroxide, the second using a mixture of sodium hydroxide and calcium hydroxide in the weight ratio 75:25, the third using a mixture of sodium hydroxide and calcium hydroxide in the ratio 25:75, and the fourth using straight calcium hydroxide. The actual amounts of reagents used were 7.2 grams sodium hydroxide for the first sample, 5.4 grams sodium hydroxide and 1.7 grams calcium hydroxide for the second sample, 1.8 grams sodium hydroxide and 5.1 grams calcium hydroxide for the third sample, and 6.8 grams calcium hydroxide for the fourth sample. The extract from the first sample (sodium hydroxide) was designated F; from the second sample (sodium hydroxide and calcium hydroxide), G; from the third sample (sodium hydroxide and calcium hydroxide), H; and from the fourth sample (calcium hydroxide), I.

Portions of each of Extracts F, G, H and I were measured colorimetrically. Another portion of each extract was stirred at 70° C. for one hour with 10% activated carbon, based on the weight of the solids in each extract (the carbon used being that sold by the Pittsburgh Coke and Chemical Company under the trade name "RB Pulverized"). After filtering off the carbon, the resulting extracts (designated $F_1$, $G_1$ $H_1$ and $I_1$, respectively) were also measured colorimetrically.

As will be seen from the color chart at the end of the examples, there is a great improvement in color when calcium hydroxide is used, as against the sample extracted solely with sodium hydroxide. When mixtures of sodium and calcium hydroxide are used, the improvement is more marked with larger ratios of the calcium hydroxide. Furthermore, it is seen that when extraction is followed by decolorization with activated carbon (or equivalent decolorizing medium) the additional lightening of color is considerably more marked when calcium hydroxide constitutes all or part of the extraction medium.

As a further color determination, samples were tested by means of Tristimulus reflectance readings, using a Photovolt Corporation Photoelectric Reflectance Meter, Model 610. Green, amber and blue filters were used, standardized against magnesium oxide. In order to obtain these readings, films of the carbon-treated extracts $F_1$, $G_1$, $H_1$ and $I_1$, in the form of 15% solids aqueous dispersions, pH 8, were deposited on milk glass. The films, when air-dried, were 0.1 mil. thick. From the readings of these films, a yellowness index value was calculated, according to the formula given in Federal Specification TT–P–141b, Method 613.1. This index yields a scale of yellowness, increasing from 0 for a magnesium oxide surface, to positive values for yellowish surfaces and negative values for bluish surfaces.

These yellowness index values follow:

| Extract: | Yellowness |
| --- | --- |
| $F_1$ | 0.214 |
| $G_1$ | 0.151 |
| $H_1$ | 0.041 |
| $I_1$ | 0.026 |

From the above it is seen of course that the sodium hydroxide Extract $F_1$ is by far the most yellow. The reduction in yellowness when using even a 75:25 sodium hydroxide-calcium hydroxide ratio ($G_1$) is obvious. It is further noted that the products extracted with the higher ratios of calcium hydroxide ($H_1$ and $I_1$) retain the least color after activated carbon treatment.

The extraction of hemicellulose from corn bran with straight calcium hydroxide was repeated, following the procedure set forth in this example, except that the amount of calcium hydroxide was reduced to give a pH of 10 in the initial bran-water-calcium hydroxide slurry. Additional calcium hydroxide was added, as needed, during the mixing period of about one hour, in order to maintain the pH at about 10. The improved color of the resulting extract was comparable to that of Extract I.

EXAMPLE V

This example illustrates the extraction of hemicellulose at relatively high temperatures, using calcium hydroxide.

The general procedure of Example I was followed, using calcium hydroxide in place of the sodium hydroxide. Thus, 300 grams of coarse corn bran were slurried in 3 liters of water containing 20 grams of calcium hydroxide (1.8 milliequivalents of alkali per gram of bran). The initial pH was 12.0; the final pH after autoclaving at 70–73 p. s. i. steam pressure (approximately 158° C.) for ¾ hour, was 7.5. After centrifuging, the extract was clarified by passing through a filter aid (Johns-Manville Corporation's "Super-Cel"). This extract was designated "Extract J." A portion of the extract was treated with activated carbon (as in Example I), and the thus decolorized extract was designated "$J_1$." It will be seen from the colorimetric measurements at the end of the examples that both J and $J_1$ are notably lighter in color than the corresponding extracts resulting from the conventional sodium hydroxide extraction process, and also that the extract obtained by the line treatment is much more effectively decolorized by activated carbon than a corresponding sodium hydroxide extract treated under similar conditions.

EXAMPLE VI

This example illustrates the extraction of hemicellulose from the bran of that variety of corn known as "waxy maize."

300 grams of coarse bran obtained from the wet-milling of waxy maize was heated in 3 liters of water containing 30 grams of calcium hydroxide (2.7 milliequivalents per gram of bran) at 147–160° C. for one hour. The initial pH was 12; the final pH 9. The reaction mixture was diluted with 2 liters of water and strained through cheese cloth to remove a substantial portion of the solid residue. The cloudy extract was then centrifuged. The extract amounted to 3300 ml., with 2.3% solids content. After removing an aliquot for subsequent treatment and colorimetric measurement, the remainder was adjusted to pH 4.5 and precipitated with alcohol, as described in the previous examples. The total calculated yield of hemicellulose was 27% dry solids basis.

The aliquot was filtered through diatomaceous silica (Johns-Manville Corporation's "Super-Cel"), to give a clear, straw-colored liquid, which was then mixed with activated carbon (Pittsburgh Coke and Chemical Company's "RB Pulverized") and allowed to agitate gently at 60° C. overnight. The amount of carbon employed was 15%, based on the solids content of the extract. After removal of the carbon, a clear, water-white syrup was obtained, designated "$K_1$." As will be seen from the table at the end of the example, only 4% of residual color remained (as compared to 100% for the sodium hydroxide extracted hemicellulose of Example I).

In a variation of the above example, the extract was adjusted to pH 5 before treating with the activated carbon, and it was found that decolorization under such acid conditions appears to be even more efficient. In another variation, the acidified extract was mixed with a synthetic decolorizing resin "Permutit DR" (a trade name used by the Permutit Company), in place of activated carbon. Excellent decolorizing effects were obtained.

EXAMPLE VII

This example illustrates the extraction of hemicellulose from a destarched corn bran.

Corn bran, as obtained in the wet-milling process of corn refining, ordinarily contains a small percentage of residual starch. In order to remove this starch, the corn bran (1 kg. at 10% moisture) was heated in 10 liters of water at 100° C. for 1 hour to gelatinize the starch. After cooling to 50° C. and adjusting to pH 4.5, 20 grams of a diastatic enzyme was added (of the type sold by Rohm & Haas Co. under the trade name "Rhozyme 33"). The mixture was permitted to react overnight, at which time a negative test was obtained for starch, when a sample was treated with iodine solution. The bran was washed thoroughly with water, separated by centrifuging and dried.

300 grams of destarched corn bran were heated in an autoclave with a slurry of 30 grams of calcium hydroxide in 3 liters of water. The heating took place at 137–160° C. for 1 hour. The initial pH was 12.5; the final pH 9.5. 3500 ml. water were added, and the extract separated from the solid residue by centrifuging. The extract amounted to 5280 ml.

After clarification by passage through a Sharples Laboratory Supercentrifuge, and filtration through asbestos filter-aid (of the type sold by the Hercules Filter Company under the trade name "Chrysolite Brilliant Asbestos C. P."), there remained 4640 ml. of a clear straw-colored extract, which was designated "Extract L."

A 600 ml. aliquot of Extract L was treated to remove calcium ion, this being done by slurrying the extract with 8 gms. of a cation exchange resin in the hydrogen cycle (as for example Rohm & Haas Corporation's "Amberlite IR-120") for 4 hours at 95° F. (negative test for calcium with ammonium oxalate). The extract was separated from the resin by filtration, and was designated "M."

A portion of ion-exchange treated Extract M was then mixed with 10% activated carbon, based on the weight of the solids in the extract, for 2 hours at 60° C. and the carbon was removed by filtration to yield a water-white syrup, designated "N."

It is seen from the colorimetric measurement table, at the end of the example, that whereas the calcium hydroxide extracted material (L) is far lighter in color than any extract obtained with sodium hydroxide, still lighter color (actually water-white) resulted from the combination of the ion exchange and activated carbon treatments.

In preparing the various hemicellulose extracts for colorimetric measurement, all the samples were diluted with water to 1% solids, clarified if necessary by filtration, and adjusted to pH 8.5. The measurements were made on a colorimeter sold by the Bausch & Lomb Optical Co. under the designation "Spectronic 20." The colorimeter was equipped with an Arthur H. Thomas Co. "Rotocell" attachment. An Arthur H. Thomas Co. No. 9085 N rectangular partitioned absorption cell of "Corex" glass with a 10 mm. light path was used. This colorimeter measured the percent light transmitted through the sample at various wave lengths, using distilled water as the standard (100% transmittance). Thus, the higher the transmittance value, the less colored the product. While readings were taken at a number of wave lengths, the variation among different samples was fairly consistently uniform over a wide range of wave lengths. Therefore, for purposes of brevity, the following table lists only readings taken at a wave length of 450 millimicrons.

As a further means of evaluating the reduction in color, the above-described light transmittance values were translated into values for "percent residual color." These were calculated according to Beer's law, which relates light transmittance to color concentration. (See the book "Instrumental Analysis," Harley and Wiberly, John Wiley & Son, N. Y., 1954, pp. 12–18.) Taking the sodium hydroxide extracted material of Example I as 100%, it is seen that any lower values signify a reduction in color. Thus a 4% residual color for Extract $K_1$ means that only 4% of the color remained, as compared to the sodium hydroxide extract (the material being practically water-white).

Table 1

RESIDUAL COLOR IN EXTRACTS

[Percent light transmittance measured at 450 mμ, pH 8.5, 1% solids; distilled water=100%; percent residual color based on amount in darkest extract (Example I).]

| Example | Extract | Description of Extract | Percent Light Transmittance | Percent Residual Color |
| --- | --- | --- | --- | --- |
| I | A | Sodium hydroxide extract | 15.0 | 100 |
|  | $A_1$ | Carbon treated "A" | 17.0 | 94 |
| II | B | Lime extract—room temp | 63.0 | 24 |
|  | C | Second extract from same bran | 69.0 | 20 |
| III | D | Lime extract—70° C | 77.0 | 14 |
|  | E | Second extract from same bran | 77.0 | 14 |
|  | F | Sodium hydroxide extr. 95–100° C. | 15.0 | 100 |
|  | $F_1$ | Carbon treated "F" | 17.0 | 94 |
|  | G | Sodium hydroxide—lime 3:1 | 31.5 | 61 |
| IV | $G_1$ | Carbon treated "G" | 52.5 | 34 |
|  | H | Sodium hydroxide—lime 1:3 | 48.5 | 38 |
|  | $H_1$ | Carbon treated "H" | 61.0 | 26 |
|  | I | Lime extract | 51.0 | 35 |
|  | $I_1$ | Carbon treated "I" | 72.0 | 17 |
| V | J | Lime extract—158° C | 60.5 | 27 |
|  | $J_1$ | Carbon treated "J" | 76.5 | 14 |
| VI | $K_1$ | Lime extract from waxy maize-carbon treated | 93.0 | 4 |
|  | L | Lime extract from destarched bran | 71.5 | 18 |
| VII | M | Calcium removed from "L" | 84.0 | 9 |
|  | N | Carbon treated "M" | 91.5 | 5 |

It is clear from the above table that there is a marked reduction in color when hemicellulose is extracted with lime, as contrasted to the relatively dark product obtained when sodium hydroxide is used as the sole extractant. Optimum results are obtained when the lime extraction is followed by decolorizing treatment with activated carbon.

Summarizing, our process offers a relatively simple and commercially practicable means of obtaining light-colored hemicellulose extracts from corn bran and thus greatly widens the field of use of these materials. In its broadest aspect, our process comprises the extraction of hemicellulose from hemicellulose-containing plant material in the presence of calcium hydroxide, preferably followed by further decolorization of the hemicellulose extract with activated carbon. It is obvious that equivalents and variations in materials, proportions and procedures may suggest themselves to the practitioner in the art, without departing from the scope of our invention as described in the following claims.

We claim:

1. The method of extracting hemicellulose from corn bran which consists in treating the corn bran with alkali selected from the class consisting of sodium, potassium, ammonium and calcium hydroxides, the treatment comprising mixing the corn bran in the presence of water with said alkali and maintaining the mixture at a temperature within the range room temperature to 190° C., at least 23% of said alkali comprising calcium hydroxide, the total alkali being in an amount to provide a pH within the range of 10–12.5 at the beginning of the extraction reaction, and then separating the resulting hemicellulose extract from the residual solids.

2. The method of claim 1 in which the corn bran is obtained from a waxy maize corn.

3. The method of claim 1 in which the extraction reaction is carried out for an appreciable time at a temperature range of 90° C. to 160° C.

4. The method of claim 1 in which the corn bran is first heated in water above the gelatinization temperature of starch in order to gelatinize residual starch in said bran and then treated with a diastatic enzyme in order to destarch said bran and in which the obtained extract is treated with a cation exchange resin to remove calcium ion.

5. The method of claim 1 in which the pH at the end of the extraction reaction remains above 6.5.

6. The method of extracting hemicellulose from corn bran which consists in treating the corn bran with calcium hydroxide, the treatment comprising mixing the corn bran in the presence of water with calcium hydroxide and maintaining the mixture at a temperature within the range room temperature 190° C., the calcium hydroxide being in an amount to provide a pH within the range of 10–12.5 at the beginning of the extraction reaction, and then separating the resulting hemicellulose extract from the residual solids.

7. The method of extracting hemicellulose from corn bran which consists in treating the corn bran with an alkali comprising sodium hydroxide and calcium hydroxide and a calcium hydroxide, the ratio of calcium hydroxide to sodium hydroxide being in the proportion of at least 0.3:1, the treatment comprising mixing the corn bran in the presence of water with said alkali and maintaining the mixture at a temperature within the range room temperature 190° C., the alkali being in an amount to provide a pH within the range of 10–12.5 at the beginning of the extraction reaction, and then separating the resulting hemicellulose extract from the residual solids.

References Cited in the file of this patent

UNITED STATES PATENTS 1,819,233   Darling ---------------- Aug. 18, 1931